United States Patent [19]

Tazoe et al.

[11] Patent Number: 5,720,425
[45] Date of Patent: Feb. 24, 1998

[54] METHOD OF SPLICING ROLLED PLATES AND APARATUS FOR THE SAME

[75] Inventors: Nobuhiro Tazoe; Toshio Iwanami, both of Yokohama; Masaumi Oki, Shizuoka-ken; Kouiti Sakamoto, Ibaragi-ken; Tadao Ebukuro, Nara, all of Japan

[73] Assignees: Ishikawajima-Harima Heavy Industries Co., Ltd.; Sumitomo Metal Industries Co., Ltd., both of Tokyo, Japan

[21] Appl. No.: 528,669

[22] Filed: Sep. 15, 1995

[30] Foreign Application Priority Data

Mar. 15, 1995 [JP] Japan ................................. 7-055488

[51] Int. Cl.$^6$ ................................................. B23K 37/047
[52] U.S. Cl. ........................ 228/171; 228/220; 228/251; 228/5.1; 228/5.7
[58] Field of Search .......................... 228/5.1, 5.7, 13, 228/42, 171, 220, 251

[56] References Cited

U.S. PATENT DOCUMENTS

| | | | |
|---|---|---|---|
| 3,336,657 | 8/1967 | Flaming | 228/171 |
| 4,854,493 | 8/1989 | Fujii et al. | 228/13 |
| 5,222,654 | 6/1993 | Oki et al. | 228/220 |
| 5,509,600 | 4/1996 | Okada et al. | 228/205 |

FOREIGN PATENT DOCUMENTS

| | | |
|---|---|---|
| A-59-141303 | 8/1984 | Japan . |
| A-61-108408 | 5/1986 | Japan . |
| A-61-137610 | 6/1986 | Japan . |
| A-62-127186 | 6/1987 | Japan . |
| 62-252603 | 11/1987 | Japan . |
| 63-93408 | 4/1988 | Japan . |
| A-3-268882 | 11/1991 | Japan . |
| A-4-200907 | 7/1992 | Japan . |
| 5-139 | 1/1993 | Japan . |
| A-6-234005 | 8/1994 | Japan . |
| A-6-335785 | 12/1994 | Japan . |
| A-7-323305 | 12/1995 | Japan . |
| A-8-10809 | 1/1996 | Japan . |
| A-8-24905 | 1/1996 | Japan . |

Primary Examiner—P. Austin Bradley
Assistant Examiner—Jeffrey T. Knapp
Attorney, Agent, or Firm—Griffin, Butler, Whisenhunt & Kurtossy

[57] ABSTRACT

The invention provides a method of splicing rolled plates with each other, including the steps of (a) positioning a rear end portion of a leading rolled plate above a front end portion of a following rolled plate by a distance slightly greater than a diameter of a cylindrical cutter having a rotation axis extending in a width-wise direction of the leading and following rolled plates, the positioning being carried out while the leading and following rolled plates are being transferred, (b) cutting an upper surface of the front end portion of the following rolled plate with the cylindrical cutter only within a region at which the following rolled plate is to be spliced with the leading rolled plate, the cutting being carried out in a direction F in which the rolled plates are being transferred, (c) blowing a first reducing flame to the upper surface being cut from above the upper surface in the direction F while the step (b) is being carried out, (d) cutting a lower surface of the rear end portion of the leading rolled plate only within a region at which the leading rolled plate is to be spliced with the following rolled plate, the cutting being carried out in a direction R opposite to the direction F after the step (b) has been completed, (e) blowing a second reducing flame to the lower surface being cut from below the lower surface in the direction R while the step (d) is being carried out, and (f) splicing the leading rolled plate with the following rolled plate by compression at the region after the step (d) has been completed, the reducing flames being blown to both the upper surface of the front end portion of the following rolled plate and the lower surface of the rear end portion of the leading rolled plate until the splicing are completed. The invention also provides an apparatus for carrying out the above mentioned method.

8 Claims, 10 Drawing Sheets

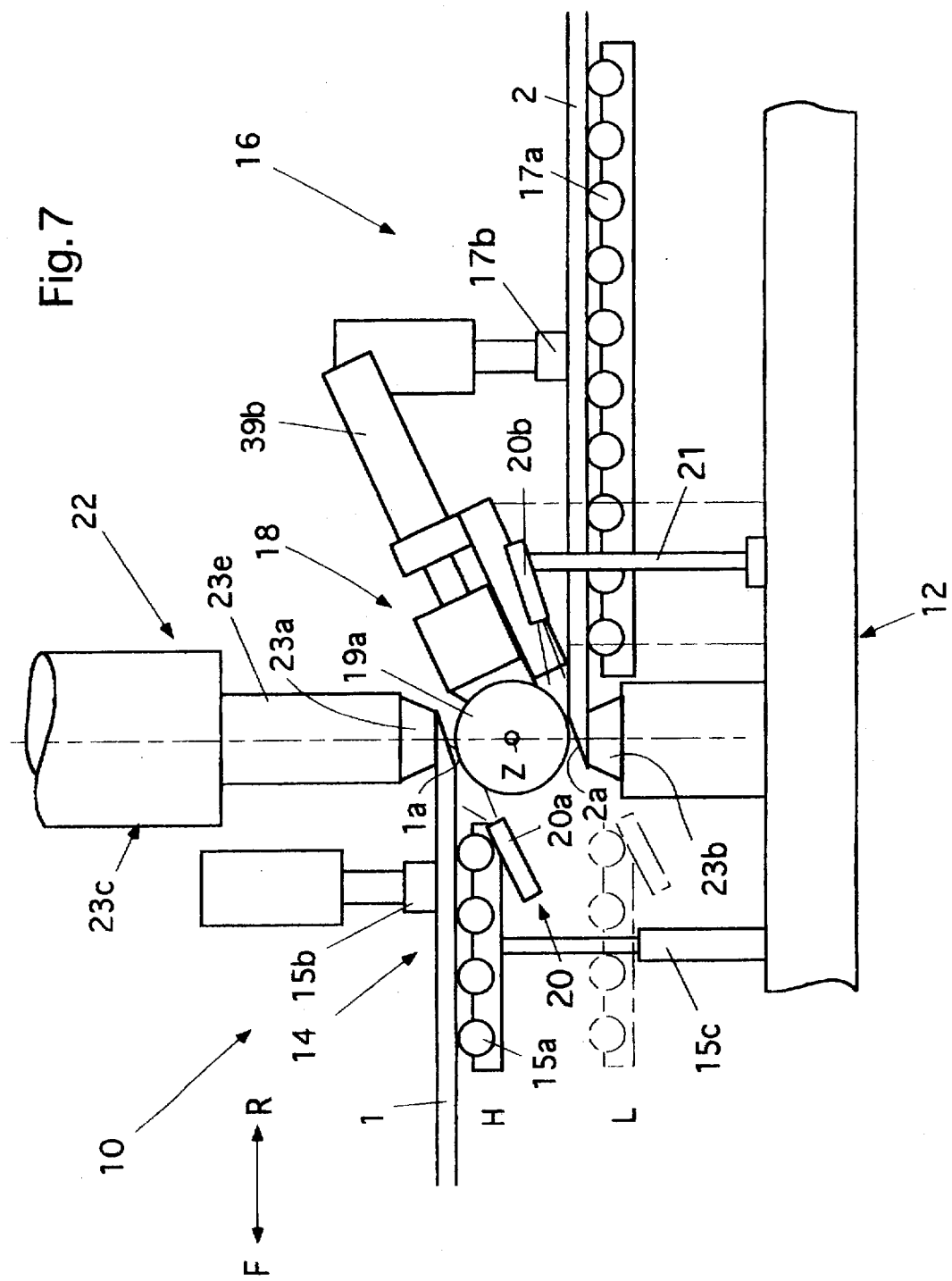

Fig. 8A
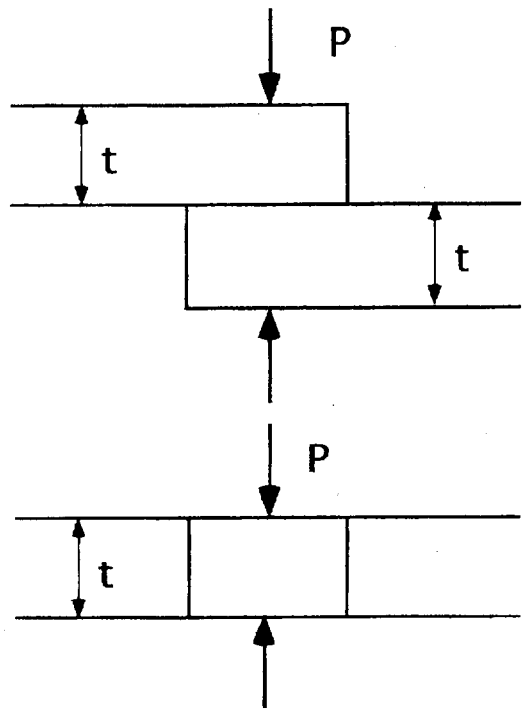
Fig. 8B
Fig. 8C
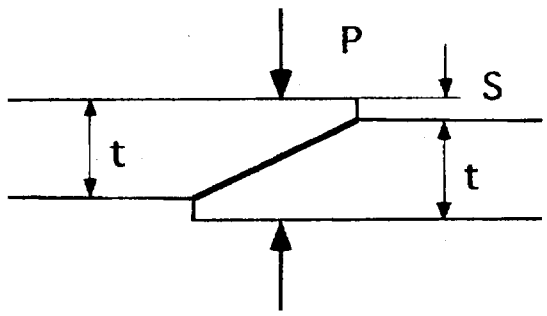
Fig. 8D
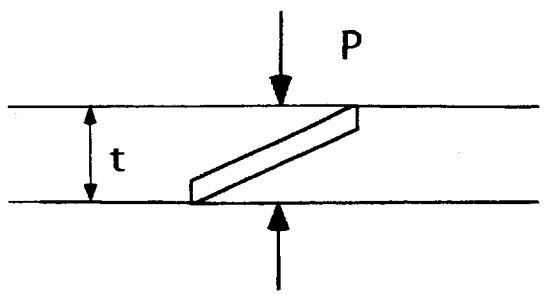

METHOD OF SPLICING ROLLED PLATES AND APARATUS FOR THE SAME

BACKGROUND OF THE INVENTION

1. Field of the Invention

The invention relates to a method and an apparatus for splicing a rear end portion of a leading rolled plate with a front end portion of a following rolled plate in a hot strip mill while the leading and following rolled plates are being transferred.

2. Description of the Prior Art

In a conventional hot strip mill, a bar having been rolled in a rough-rolling mill is individually fed into a finishing rolling mill, in which the fed bar is processed to a strip having a desired thickness. However, such a conventional hot strip mill has many problems. For instance, the conventional strip mill cannot uniformly roll a plate. In addition, front and rear end portions of a rolled plate tend to be damaged in the conventional strip mill, resulting in a lowering of the production yield of rolled plates. Furthermore, it is difficult to raise the rolling rate because of jamming and/or failure of rolling.

In order to resolve those problems, there have been suggested apparatuses or methods for splicing a rear end portion of a leading rolled plate with a front end portion of a following rolled plate so as to successively feed rolled plates into a finishing rolling mill. For instance, such apparatuses and methods are suggested in Japanese Unexamined Patent Public Disclosures Nos. 62-252603 and 63-93408, and Japanese Patent Publication No. 5-139.

Japanese Unexamined Patent Public Disclosure No. 62-252603 has suggested a method of joining plates with each other, in which method couplers are driven into edges of plates to be joined with each other to thereby join the plates with each other through the couplers. However, in this method, it is necessary to drive a lot of couplers into edges of plates in a quite short period of time in order to ensure sufficient coupling strength across an entire width of a plate. Thus, the method is difficult to be automatically carried out, and further has a problem that coupling portions cannot be uniformly rolled.

Japanese Unexamined Patent Public Disclosure No. 63-93408 has suggested a bar joining facility in which a rear end of a rolled plate is joined by compression to a front end of another rolled plate by forming a loop in the rolled plates. In this facility, since a relatively thick bar is formed into a loop, the bar tends to readily bent, and it is impossible to take sufficient time for joining. In addition, the facility poses a problem that sufficient joining strength cannot be obtained across an entire width of rolled plates by only joining a rear end of a rolled plate to a front end of another by compression.

Japanese Patent Publication No. 5-139 has suggested an apparatus for joining strips being transferred by melting. This apparatus melts and thereby joins a rear end and a front end of rolled plates to each other, moving along with the rolled plates. This apparatus has the following problems: The entire length of this apparatus tends to be too long because it takes much time to melt rolled plates having a wide width. In addition, irregularities tend to be formed in joining portions of the rolled plates, and also it is difficult in the apparatus to uniformly roll joining portions.

Furthermore, if the above mentioned facility or apparatus is added to an existing line, it is necessary to significantly modify the existing line with the result of long period of down time in which the existing line is forced to be stopped.

In general, when two rolled plates are to be joined or spliced one on the other by compression, a rear end portion of a leading rolled plate is compressively joined or spliced over a front end portion of a following rolled plate. If there exist scales on surfaces of rolled plates at which two rolled plates are compressively spliced, such scales are removed with a cutter, for instance. However, the surfaces of rolled plates at which two rolled plates are compressively spliced are likely to be oxidized again before spliced, and thus splicing intensity may be possibly deteriorated. In addition, chips of a rolled plate cut by a cutter may be left on a part of surfaces of rolled plates at which two rolled plates are to be compressively spliced.

In order to successively supply rolled plates to a finishing rolling mill and uniformly roll a portion of rolled plates at which the two rolled plates are to be spliced with each other, it is necessary to compress overlapped portion of the two rolled plates to a thickness of a single rolled plate. Such compression needs quite a large force, for instance about 1000 tons. This poses a problem that a compression apparatus cannot avoid from being quite large.

SUMMARY OF THE INVENTION

The present invention has been made in order to overcome the above mentioned problems. It is an object of the present invention to provide a method and apparatus which make it possible to run along with leading and following rolled plates being transferred and splice a rear end portion of the leading rolled plate with a front end portion of the following rolled plate, splice the rolled plates with each other with sufficient splicing strength across an entire width of the rolled plates in a short period of time, and splice the rolled plates with each other with spliced portions of the rolled plates being uniformly finished and thus almost no irregularities being formed in the spliced portions, thereby successively supplying rolled plates to a finishing rolling mill.

Another object of the present invention is that, on a region of rolled plates at which the rolled plates are to be spliced with each other, scale and chips which are generated by removal of scale are not deposited. A further object of the present invention is to make it possible to splice rolled plates with each other by means of an apparatus having a relatively small size and output.

The invention provides a method of splicing rolled plates with each other, including the steps of (a) positioning a rear end portion of a leading rolled plate above a front end portion of a following rolled plate by a distance slightly greater than a diameter of a cylindrical cutter having a rotation axis extending in a width-wise direction of the leading and following rolled plates, the positioning being carried out while the leading and following rolled plates is being transferred, (b) cutting an upper surface of the front end portion of the following rolled plate with the cylindrical cutter only within a region at which the following rolled plate is to be spliced with the leading rolled plate, the cutting being carried out in a direction F in which the rolled plates are being transferred, (c) blowing a reducing flame on the upper surface being cut from above the upper surface in the direction F while the step (b) is being carried out, (d) cutting a lower surface of the rear end portion of the leading rolled plate only within a region at which the leading rolled plate is to be spliced with the following rolled plate, the cutting being carried out in a direction R opposite to the direction F after the step (b) has been completed, (e) blowing a reducing flame on the lower surface being cut from below the lower surface in the direction R while the step (d) is being carried out, and (f) splicing the leading rolled plate with the following rolled plate by compression at the region after the step (d) has been completed, the reducing flame being blown to both the upper surface of the front end portion of the following rolled plate and the lower surface of the rear end portion of the leading rolled plate until the splicing is completed.

In accordance with the invention, the upper surface of the front end portion of the following rolled plate is cut in the direction F, namely a direction in which the leading and following rolled plates are being transferred, and the reducing flame is blown to the upper surface being cut from thereabove in the direction F. Thus, the reducing flame is blown from behind the cylindrical cutter while the rolled plate is being cut, and thereby the upper surface of the front end portion of the following rolled plate which is being cut is maintained in non-oxidation condition, and in addition the reducing flame blows off chips. When the upper surface of the rear portion of the leading rolled plate is being cut, there is formed a gap between the cylindrical cutter and the upper surface of the front end portion of the following rolled plate. Thus, the reducing flame can sufficiently cover the upper surface of the front end portion of the following rolled plate through the gap. While the lower surface of the rear end portion of the leading rolled plate is being cut, the cylindrical cutter moves in the direction R, and the reducing flame is blown to the lower surface of the rear end portion of the leading rolled plate from below the leading rolled plate in the direction R. Thus, the reducing flame is blown to the leading rolled plate from behind the cylindrical cutter to thereby keep the lower surface of the rear end portion of the leading rolled plate in non-oxidation condition and blow chips off. After the lower surface of the rear end portion of the leading rolled plate and the upper surface of the front end portion of the following rolled plate have been cut, they are spliced to each other. While the rolled plates are being spliced to each other, the reducing flame is blown on the spliced portions of the rolled plates. Thus, the rolled plates are spliced to each other without the spliced portions being oxidized, thereby ensuring sufficient splicing intensity of the rolled plates. Chips caused by the cylindrical cutter cutting rolled plates are also removed by the reducing flame.

The invention further provides a method of splicing rolled plates with each other, including the steps of (a) positioning a rear end portion of a leading rolled plate above a front end portion of a following rolled plate by a distance slightly greater than a diameter of a cylindrical cutter having a rotation axis extending in a width-wise direction of the leading and following rolled plates, the positioning being carried out while the leading and following rolled plates are being transferred, (b) cutting a lower surface of the rear end portion of the leading rolled plate with the cylindrical cutter only within a region at which the leading rolled plate is to be spliced with the following rolled plate, the cutting being carried out in a direction R opposite to a direction F in which the rolled plates are being transferred, (c) blowing a reducing flame on the lower surface being cut from below the lower surface in the direction R while the step (b) is being carried out, (d) cutting an upper surface of the from end portion of the following rolled plate only within a region at which the following rolled plate is to be spliced with the leading rolled plate, the cutting being carried out in the direction F after the step (b) has been completed, (e) blowing a reducing flame on the upper surface being cut from above the upper surface in the direction F while the step (d) is being carried out, and (f) splicing the leading rolled plate with the following rolled plate by compression at the region after the step (d) has been completed, the reducing flame being blown to both the upper surface of the front end portion of the following rolled plate and the lower surface of the rear end portion of the leading rolled plate until the splicing is completed.

As will be understood from the above mentioned method, the order of cutting, leading and following rolled plates may be changed. Namely, a lower surface of a rear end portion of a leading rolled plate may be first cut, and then an upper surface of a front end portion of a following rolled plate may be cut. The cutting by a cylindrical cutter and blowing reducing flame is carried out in the same manner as those of the firstly mentioned method. This method also ensures sufficient splicing strength to the spliced portion of the rolled plates. Chips caused by the cylindrical cutter cutting rolled plates are also removed by the reducing flame.

In the firstly and above mentioned methods, the cylindrical cutter is preferably moved in parallel with an inclined plane which is downwardly inclined as viewed in the direction F. In the above mentioned method, since the cylindrical cutter is moved to grind the rolled plates in parallel with an inclined plane which is downwardly inclined as viewed in the direction F, the spliced portions of the rolled plates are obliquely cut. Thus, there are formed no steps between the spliced portion and non-spliced portion of the rolled plates, and hence the rolled plates can be favorably spliced with each other. In addition, the obliquely cut rolled plates would make it easier to blow the reducing flame thereto.

The invention still further provides a method of splicing rolled plates with each other, including the steps of positioning one of a teat end portion of a leading rolled plate and a front end portion of a following rolled plate above the other by a certain distance with the rear and front end portions being kept horizontally, the rolled plates being fed in a direction, cutting concurrently both a lower surface of an end portion of one of the leading and following rolled plates and an upper surface of an end portion of the other with a region, at which the leading rolled plate is to be spliced with the following rolled plate, being kept in non-oxidation condition, and compressing the region to a thickness approximately equal to a thickness of the leading or following rolled plate with the region being kept in non-oxidation condition to thereby splice the leading and following plates with each other. In this method, .it is preferable to concurrently, horizontally or obliquely grind both a lower surface of an end portion of one of leading and following rolled plates and an upper surface of an end portion of the other.

In another aspect, the invention provides an apparatus for splicing rolled plates with each other, including a carriage movable in a direction F in which the rolled plates are being fed, a rear end clamp device mounted on the carriage for horizontally clamping a rear end portion of a leading rolled plate, the rear end clamp apparatus being vertically movable, a front end clamp device mounted on the carriage for horizontally clamping a front end of a following rolled plate, a cutting device for cutting a lower surface of an end portion of one of the leading and following rolled plates and an upper surface of an end portion of the other, a device for keeping the lower and upper surfaces being cut in non-oxidation condition, and a pressure welding device for compressing the lower and upper surfaces of the end portions of the leading and following rolled plates one on the other to a thickness almost equal to a thickness of the leading or following rolled plate to thereby splice the leading and following rolled plates to each other.

In accordance with the apparatus, the carriage runs in the direction F with the leading and following rolled plates being clamped by the rear end clamp device and the front end clamp device. Hence, it is possible to successively supply rolled plates to a finishing rolling mill. In addition, since rolled plates can be spliced with each other across an entire width of the rolled plates only in two steps, namely, a step for cutting the rolled plates by the cutting device and a step for compressing the rolled plates by the pressure welding device, it is possible to remarkably reduce the time required time for splicing the rolled plates with each other, and shorten to the entire length of the facility for rolling. Furthermore, a lower surface of an end portion of one of leading and following rolled plates and an upper surface of an end portion of the other are cut by the cutting device, and further cut portions of the rolled plates ate compressed by the pressure welding device to a thickness of a single rolled plate while spliced portions of the rolled plates are maintained in non-oxidation condition by the non-oxidation condition keeping device. As a result, the leading and following rolled plates can be closely spliced without oxidation of the spliced portions of the rolled plates and also without any gap between the rolled plates, and it is possible to obtain sufficient splicing strength across an entire width of the rolled plates. In addition, since the leading and following rolled plates ate compressed to a thickness of a single rolled plate and then spliced with each other by the pressure welding device, there is formed almost no irregularity at the spliced portions of the rolled plates, and thus the spliced portions can be uniformly compressed.

In a preferred embodiment, the cutting device includes a cylindrical cutter rotatable about a rotation axis extending in a width-wise direction of the leading and following rolled plates, a swinger device for swinging the cylindrical cutter about an axis extending in a width-wise direction of the leading and following rolled plates, and a reciprocator for reciprocating the swinger device in a direction F in which the leading and following rolled plates are being fed, and the non-oxidation condition keeping device includes a reducing flame burner attached to the rear end clamp device for blowing reducing flame to the lower surface, which is being cut with the cylindrical cutter with the leading rolled plate being supported by the rear end clamp device, from below the leading rolled plate in a direction R opposite to the direction F, and another reducing flame burner attached to the carriage for blowing reducing flame to the upper surface, which is being cut with the cylindrical cutter with the following rolled plate being supported by the front end clamp device, from above the following rolled plate in the direction F.

In this embodiment, the carriage runs in the direction F with the leading and following rolled plates being clamped by the rear end clamp device and the front end clamp device. In addition, the cutting device for cutting the spliced portions of the rolled plates and the pressure welding device for compressing the cut rolled plates ensure to successively carry out steps of cutting and compressing the rolled plates, and hence it is possible to splice the rolled plates with each other in a shorter period of time, that is, at a higher speed. While the rolled plates are being spliced, the spliced portions of the rolled plates are maintained in non-oxidation condition by the non-oxidation condition keeping device, resulting in sufficient splicing strength of the rolled plates. In addition, since the leading and following rolled plates are compressed to a thickness of a single rolled plate and then spliced with each other by the pressure welding device, there can be obtained an almost uniform spliced portion of the leading and following rolled plates. The cutting device includes a cylindrical cutter rotatable about a rotation axis extending in a width-wise direction of the leading and following rolled plates, a swinger device for swinging the cylindrical cutter about an axis extending in a width-wise direction of the leading and following rolled plates, and a reciprocator for reciprocating the swinger device in a direction F in which the leading and following rolled plates are being fed, and thus the cylindrical cutter is movable vertically as well as in the directions A and B. The non-oxidation condition keeping device includes a reducing flame burner attached to the rear end clamp device for blowing reducing flame to the lower surface of the leading rolled plate from below the leading rolled plate in the direction R. Thus, while the leading rolled plate is being cut, the reducing flame is blown to the leading rolled plate from behind the cylindrical cutter to thereby reduce the lower surface of the rear end portion of the leading rolled plate and blow chips off. When the leading rolled plate is spliced with the following rolled plate, since the reducing flame burner is lowered along with the leading rolled plate by the rear end clamp device, it is possible to successively blow the reducing flame to the spliced portion of the leading rolled plate. In addition, the non-oxidation condition keeping device further includes another reducing flame burner attached to the carriage for blowing reducing flame to the upper surface of the following rolled plate from above the following rolled plate in the direction F. Thus, while the following rolled plate is being cut, the reducing flame is blown to the following rolled plate from behind the cylindrical cutter to thereby reduce the upper surface of the front end portion of the following rolled plate and blow chips off. When the leading rolled plate is being cut, the reducing flame can be blown to the upper surface of the front end portion of the following rolled plate through a gap formed between the cylindrical cutter and the following rolled plate. It is possible to continue blowing the reducing flame to the upper surface of the front end portion of the following rolled plate even when the leading rolled plate approaches the following rolled plate for splice. Namely, the reducing flame can be blown to the spliced portion of the leading and following rolled plates from the time when the rolled plates are started to be cut until the rolled plates are spliced with each other, and in addition, chips generated by cutting of the rolled plates with the cylindrical cutter can be blown off.

Since the reciprocator as a part of the cutting device reciprocates on an inclined plane which is downwardly inclined as viewed in the direction F, the spliced portions of the leading and following rolled plates are obliquely cut, thereby no steps being formed between the spliced portion and non-spliced portion in each of the leading and following rolled plates, which ensures sufficient splicing of the leading and following rolled plates. In addition, the obliquely cut rolled plates would make it easier to blow the reducing flame thereto.

In another preferred embodiment, the cutting device includes a cylindrical cutter rotatable about a rotation axis extending in a width-wise direction of the leading and following rolled plates; a swinger device for obliquely swinging the cutter; and a reciprocator for advancing or retreating the cylindrical cutter in the direction F, and the rear end clamp device includes a cylinder for raising and lowering the lower surface of the rear end portion of the leading rolled plate between a cutting height H at which the lower surface of the rear end portion of the leading rolled plate comes to contact with an upper edge of the cutter, and a compressing height L at which the rear end portion of the leading rolled plate is kept approximately level with the front end portion of the following rolled plate.

In this embodiment, the cylindrical cutter is adjustable in its height and can accomplish advance and retreat movement. Thus, it is possible to concurrently grind in a common plane both the lower surface of the rear end portion of the leading rolled plate and the upper surface of the front end portion of the following rolled plate.

In still another preferred embodiment, the cutting device concurrently, obliquely grinds the lower surface of the end portion of one of the leading and following rolled plates and the upper surface of the end portion of the other, and the cutting device comprises a cylindrical cutter rotatable about an rotation axis extending in a width-wise direction of the leading and following rolled plates, and a reciprocator for reciprocating the cutter obliquely as viewed in the direction F.

In this embodiment, the cutting device concurrently and obliquely, as viewed in the direction F, grinds the end portions of the leading and following rolled plates. Thus, a thickness of the overlapped portions of the leading and following rolled plates prior to splice is thinner than a thickness of overlapped rolled plates which are not obliquely cut, and a compression force for compressing the overlapped rolled plates to a thickness of a single rolled plate and splicing the rolled plates with each other can be made smaller. Hence, even an apparatus having relatively small size and output could splice rolled plates with each other with almost no irregularities on the spliced portions of the rolled plates.

In addition, since the rolled plates can be spliced with each other across an entire width of the rolled plates in only two steps, namely, a step for cutting the rolled plates by the cutting device and a step for compressing the rolled plates by the pressure welding device, it is possible to remarkably reduce the time required for splicing the rolled plates with each other. Furthermore, the rolled plates are cut and compressed to each other, while the spliced portions of the rolled plates are maintained in non-oxidation condition by the non-oxidation condition keeping device. As a result, the leading and following rolled plates can be closely spliced without oxidation of the spliced portions of the rolled plates and also without any gap between the rolled plates, and it is possible to obtain sufficient splicing strength across an entire width of the rolled plates.

In yet another preferred embodiment, the cutting device includes a conical cutter rotatable about a rotation axis extending obliquely with respect to the horizontal; and a transfer device for horizontally transferring the conical cutter in a width-wide direction of the leading and following rolled plates across entire width of the rolled plates, the transfer device being disposed out of the leading and following rolled plates, and the conical cutter has a pair of frustconical surfaces having outwardly facing apexes, the frustconical surfaces having substantially horizontal uppermost and lowermost portions which are to concurrently come in contact with the lower surface and upper surface of the end portions of the leading and following rolled plates, respectively.

In this embodiment, the conical cutter has a pair of frustconical surfaces having substantially horizontal uppermost and lowermost portions which are to concurrently come into contact with the lower surface of the rear end portion of the leading rolled plate and the upper surface of the front end portion of the following rolled plate, respectively. Thus, it is possible to concurrently grind the lower surface of the rear end portion of the leading rolled plate and the upper surface of the front end portion of the following rolled plate across an entire width of the rolled plates in a shorter period of time by only raising the rear end portion of the leading rolled plate by means of an elevator and transferring the rotating conical cutter by means of the transfer device in the width-wise direction of the rolled plates across an entire width of the rolled plates. The transfer device is first disposed out of the leading and following rolled plates, and then moved below or above the rolled plates. Furthermore, by compressing the thus cut rolled plates to each other by the pressure welding device, it is possible to splice the rolled plates with each other under sufficient splicing strength across an entire width of the rolled plates in a shorter period of time.

In still yet another preferred embodiment, the non-oxidation condition keeping device comprises a reducing flame burner which produces non-oxidation condition by burning combustible gas with a smaller amount of oxygen than an amount of oxygen necessary for completely burning the combustible gas.

In accordance with the embodiment, during a step of cutting the rolled plates by means of the cutting device and a step of compressing the cut rolled plates to each other by means of the pressure welding device, the cut portions of the rolled plates are maintained in non-oxidation condition. Thus, it is possible to avoid oxidation of the cut portions of the rolled plates, and obtain high splicing strength.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 7 is a schematic view illustrating an apparatus for splicing rolled plates with each other in accordance with the third embodiment of the present invention.

FIGS. 8A, 8B, 8C and 8D show a relationship between a load P necessary for compressing rolled plates to each other and a logarithmic strain $\epsilon$.

DESCRIPTION OF THE PREFERRED EMBODIMENTS

Preferred embodiments in accordance with the present invention will be explained hereinbelow with reference to drawings.

Figure 1:
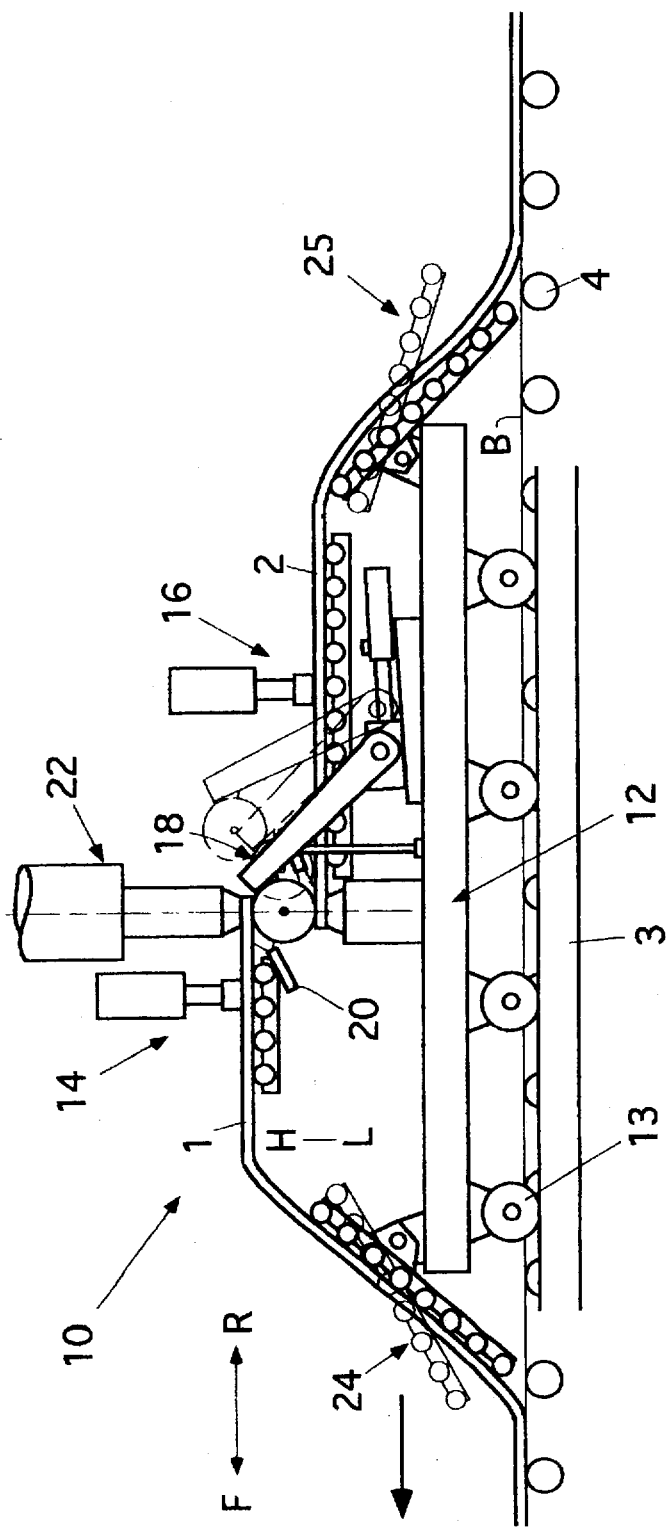
FIG. 1 is a schematic view illustrating an apparatus for splicing rolled plates with each other in accordance with the first embodiment of the present invention.

FIG. 1 is a side view illustrating an apparatus for splicing rolled plates with each other in accordance with the first embodiment of the present invention. The apparatus 10 includes a carriage 12 designed to be able to run in a direction F in which rolled plates to be spliced are transferred (from the right to the left in FIG. 1), a rear end clamp device 14 mounted on the carriage 12 and designed to horizontally clamp a rear end portion of a leading rolled plate 1 therebetween and to be vertically movable, a front end clamp device 16 mounted on the carriage 12 and designed to horizontally clamp a front end portion of a following rolled plate 2 therebetween, a cutting device 18 for cutting a lower surface of the rear end portion of the leading rolled plate 1 and an upper surface of the front end portion of the following rolled plate 2, a non-oxidation condition keeping device 20 for keeping the lower and upper surfaces to be cut in non-oxidation condition, and a pressure welding machine 22 for compressing the overlapped portions of the leading and following rolled plates 1 and 2 to a thickness almost equal to a thickness of a single rolled plate.

The carriage 12 has a plurality of wheels 13, and can run on rails 3 extending in the direction F. The carriage 12 runs to the left in FIG. 1 while the rolled plates 1 and 2 are being spliced with each other. B indicates a rolling height of a rolling mill. A plurality of rollers 4 support the rolled plates 1 and 2 at the rolling height B, and transfers the rolled plates 1 and 2 in the direction F. The rails 3 are disposed outside the rollers 4, and a compression height L is set higher than the rolling height B so that the carriage 12 is able to run at a height higher than the rails 3. The above mentioned structure makes it possible to use existing rolling mills as they are.

The illustrated apparatus 10 further includes inclined guides 24 and 25 which guide the rolled plates 1 and 2 to the front end clamp device 16 from the rolling height B of the robing mill, and guides the rolled plates 1 and 2 to the rolling height B from the rear end clamp device 14. The inclined guides 24 and 25 are swingably carried at the carriage 12, and are swingable by means of a cylinder (not illustrated) between a lowering position at which lower ends of the inclined guides 24 and 25 are disposed at the rolling height B and a raising position at which the lower ends of the inclined guides 24 and 25 are raised to a certain height so that the rolled plates 1 and 2 can pass below the inclined guides 24 and 25. The inclined guides 24 and 25 are provided with a plurality of linearly arranged rollers, and thus make it easy for the rolled plates 1 and 2 to be transferred. By raised the inclined guides 24 and 25 to the raising position, existing rolling mills can be used as they are, and by lowering the inclined guides 24 and 25 to the lowered position, it is possible to guide the following rolled plate 2 to the front end clamp device 16 from the rolling height B and also guide the leading rolled plate 1 to the rolling height B from the rear end clamp device 14.

Figure 2:
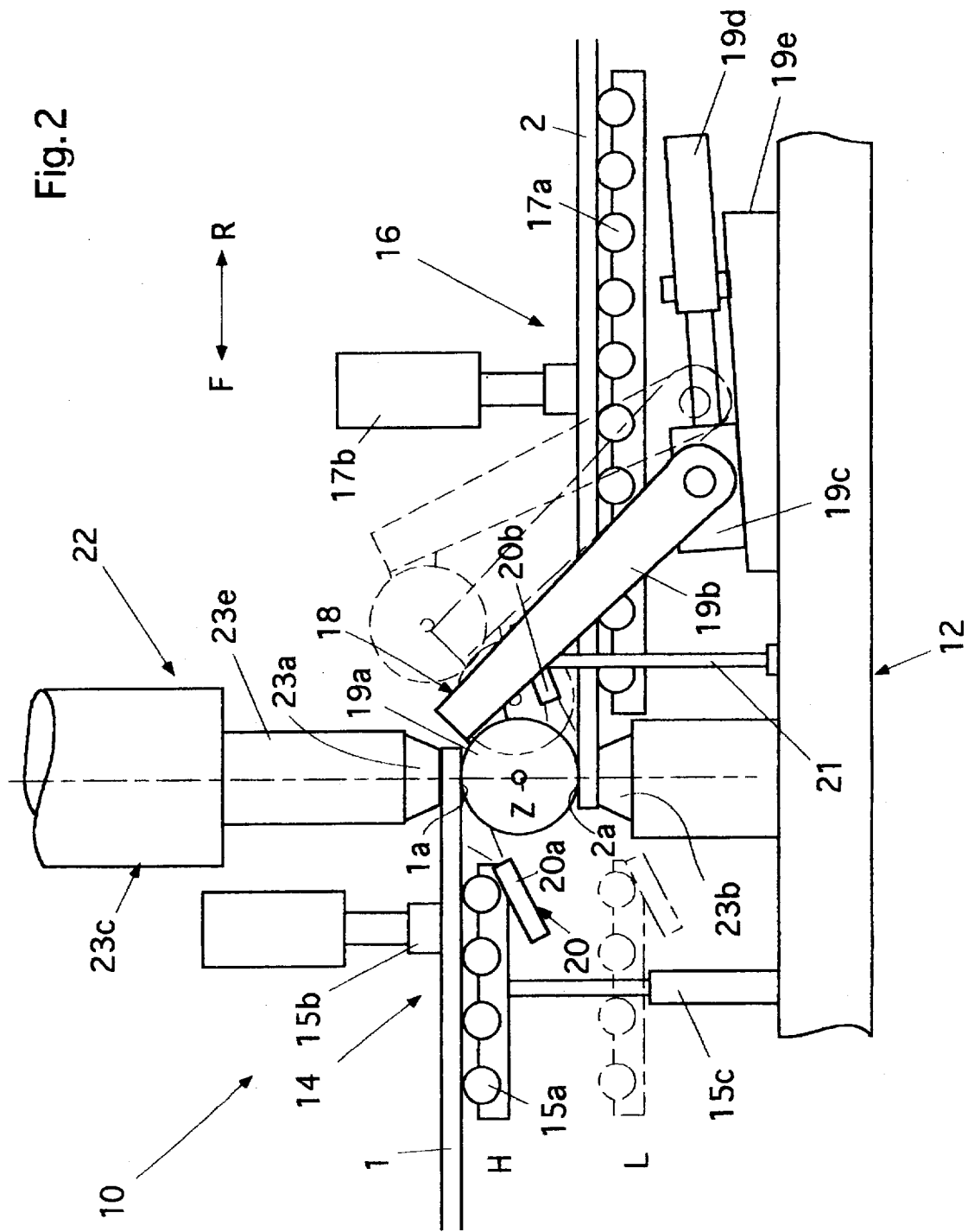
FIG. 2 is an enlarged view of a main part of the apparatus illustrated in FIG. 1.

FIG. 2 is an enlarged view mainly of the cutting device 18 and the non-oxidation condition keeping device 20. As illustrated, the rear end clamp device 14 comprises a plurality of rollers 15a for horizontally supporting the rear end portion of the leading rolled plate 1, a clamp 15b designed to be vertically movable with the rear end portion of the leading rolled plate 1 being clamped between itself and the rollers 15a, and a cylinder 15c for raising and lowering the rollers 15a and the clamp 15b between a cutting height H at which the lower surface of the rear end portion of the leading rolled plate 1 is made come to contact with an upper edge of a later mentioned cylindrical cutter 19a, and a compression height L at which the rear end portion of the leading rolled plate 1 is set almost level with the front end portion of the following rolled plate 2. By the above mentioned structure, the clamp 15b can clamp the rear end portion of the leading rolled plate 1 between itself and the rollers 15a with the rear end portion of the leading rolled plate 1 being horizontally supported by means of the rollers 15a. While the rollers 15a and the clamp 15b are kept at the cutting height H by means of the cylinder 15c, the lower surface of the rear end portion of the leading rolled plate 1 can be cut with a cylindrical cutter 19a. In addition, while the rollers 15a and the clamp 15b are kept at the compression height L by means of the cylinder 15c, the leading and following rolled plates 1 and 2 can be overlapped at their cut portions, and then compressed by the pressure welding machine 22 to thereby splice the rolled plates 1 and 2 with each other.

The front end clamp device 16 comprises a plurality of rollers 17a for horizontally supporting the front end portion of the following rolled plate 2, and a clamp 17b for clamping the front end portion of the following rolled plate 2 between itself and the rollers 17a. By the above mentioned structure, the clamp 17b can clamp the front end portion of the following rolled plate 2 between itself and the rollers 17a with the following rolled plate 2 being horizontally supported by means of the rollers 17a.

The cutting device 18 comprises a cylindrical cutter 19a rotatable about a rotation axis Z extending in a width-wise direction of the leading and following rolled plates 1 and 2, an arm 19b rotatably supporting the cylindrical cutter 19a at one end and swingable about the other end thereof, a swinger device 19c for obliquely swinging the arm 19b, a reciprocator 19d for advancing and retreating the swinger device 19c in the direction F, and a block 19e fixedly mounted on the carriage 12 and having an inclined surface which is downwardly inclined as viewed in the direction F and on which the swinger device 19c and the reciprocator 19d are supported.

The cylindrical cutter 19a is secured to the arm 19b at its distal end, and is rotated by a driver (not illustrated). The cylindrical cutter 19a is swung by the swinger device 19c and the reciprocator 19d between a cutting position indicated with a solid line in FIGS. 1 and 2 wherein the cylindrical cutter 19a individually grinds the lower surface of the rear end portion of the leading rolled plate 1 and the upper surface of the front end portion of the following rolled plate 2, and a position indicated with a broken line to which the cylindrical cutter 19a is to be swung after the rolled plates 1 and 2 have been cut.

The non-oxidation condition keeping device 20 comprises reducing flame burners 20a and 20b which produce reducing flame by burning combustible gas with a smaller amount of oxygen than an amount of oxygen necessary for completely burning the combustible gas such as coke oven gas (COG), LPG and LNG. The thus produced reducing flame is blown to portions of the rolled plates 1 and 2 at which the rolled plates 1 and 2 are to be spliced with each other, in order to avoid oxidation of the portions. The reducing flame includes reducing radicals such as hydrogen radical and $CH_2O$ radical. The reducing flame burner 20a is secured to a frame of the rollers 15a, and blows reducing flame to the lower surface of the rear end portion of the leading rolled plate 1 to thereby keep the lower surface in non-oxidation condition, while the reducing flame burner 20b is secured to the carriage 12 through a fixation stand 21, and blows reducing flame to the upper surface of the front end portion of the following rolled plate 2 to thereby keep the upper surface in non-oxidation condition. A plurality of the reducing flame burners 20a and 20b are disposed in a width-wise direction of the rolled plates 1 and 2 so that the lower and upper surfaces of the rolled plates 1 and 2 being cut are covered with reducing flame.

The pressure welding machine 22 comprises an upper die 23a having a lower surface with which the upper surface of the rear end portion of the leading rolled plate 1 is to contact, a lower die 23b having an upper surface with which the lower surface of the front end portion of the following rolled plate 2 is to contact, and a pressing machine 23c for pressing the lower and upper surfaces of the leading and following rolled plates 1 and 2 through the upper and lower dies 23a and 23b. The upper die 23a is secured to a lower surface of a ram 23e of the pressing machine 23c, and thus is raised and lowered together with the ram 23e. Thus, the rear end portion of the leading rolled plate 1 and the front end portion of the following rolled plate 2 can be supported by the upper and lower dies 23a and 23b while the cutting device 18 is cutting the rolled plates 1 and 2, and overlapped portions of the leading and following rolled plates 1 and 2 can be pressed to a thickness almost equal to a thickness of the singe rolled plate 1 or 2 by lowering the ram 23e through the pressing machine 23c.

Hereinbelow is explained the first type operation of the method to be carried out by using the apparatus in accordance with the first embodiment.

Figure 3:
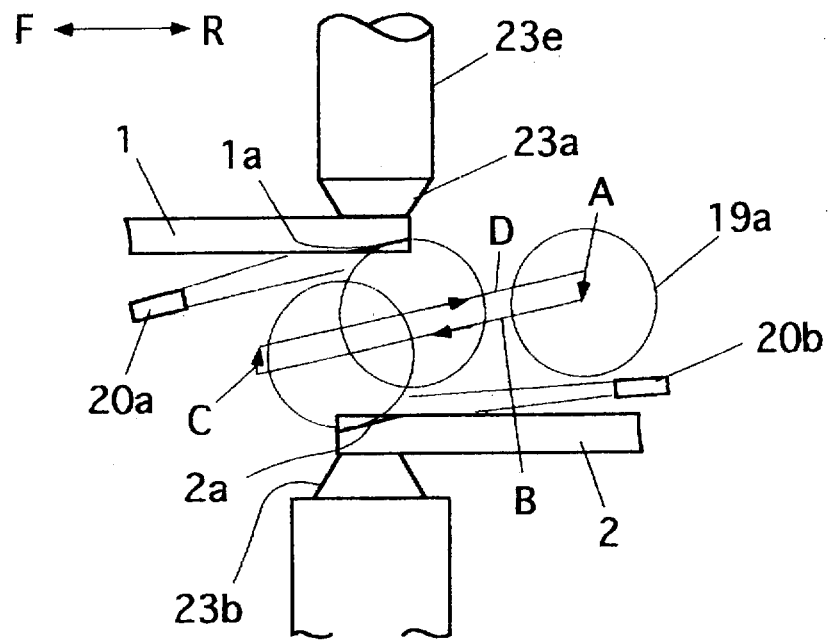
FIG. 3 shows how rolled plates are cut and reduced in a first type operation.

FIG. 3 shows how the cylindrical cutter 19a grinds and how the reducing flame burners 20a and 20b blow reducing flame to the lower surface of the rear end portion of the leading rolled plate 1 and the upper surface of the front end portion of the following rolled plate 2 in the first type operation. The leading rolled plate 1 is positioned above the following rolled plate 2 so that the rear end portion of the leading rolled plate 1 overlaps the front end portion of the following rolled plate 2 by a distance slightly greater than a diameter of the cylindrical cutter 19a. The overlap margin is determined within the range of 20 mm to 100 mm in accordance with a thickness of the rolled plates 1 and 2. The cylindrical cutter 19a is moved along a locus indicated by A in accordance with the swing motion of the arm 19b, and subsequently is moved along a locus indicated by B in accordance with the motion of the arm 19b caused by the reciprocator 19d along the inclined surface of the block 19e. Thus, the cylindrical cutter 19a obliquely grinds a portion 2a of the upper surface of the front end portion of the following rolled plate 2. While the portion 2a is being cut, the reducing flame is blown to the portion 2a from the reducing flame burner 20b to thereby remove scale, prevent oxidation of the portion 2a and blow off chips generated by cutting the rolled plate 2. After the cutting of the portion 2a of the upper surface of the front end portion of the following rolled plate 2 has been completed, the arm 19b is swung for raising the cylindrical cutter 19a along a locus indicated by C. Then, the cylindrical cutter 19a is moved by the reciprocator 19d along a locus D to grind a portion 1a of the lower surface of the rear end portion of the leading rolled plate 1. When the cylindrical cutter 19a is raised, there is formed a space between the portion 2a of the upper surface of the front end portion of the following rolled plate 2 and the cylindrical cutter 19a. Thus, the reducing burner 20b can sufficiently blow reducing flame to the portion 2a through the space.

At the same time when the portion 1a of the lower surface of the rear end portion of the leading rolled plate 1 is begun to be cut, the reducing flame burner 20a begins to blow reducing flame to the portion 1a to thereby remove scale, prevent oxidation of the portion 1a, and blow off chips generated by cutting the leading rolled plate 1. After the cutting of the rolled plate 1 has been completed, the cylindrical cutter 19a is retreated to the position indicated with a broken line in FIG. 2.

Then, the cylinder 15c is lowered to thereby lower the leading rolled plate 1 to the compression height L. Since the reducing flame burner 20a is also lowered along with the rollers 15a, the reducing flame burner 20a can continue blowing reducing flame to the portion 1a until the portion 1a of the leading rolled plate comes to contact with the portion 2a of the following rolled plate 2. The reducing flame burner 20b begins to blow reducing flame to the portion 2a at the same time when the following rolled plate 2 begins to be cut, and continues blowing reducing flame to the portion 2a until the portion 1a of the leading rolled plate comes to contact with the portion 2a of the following rolled plate 2. Then, the press 23c of the pressure welding machine 22 begins to operate, namely, lower the ram 23e for compressing the rolled plates 1 and 2. Thus, the portions 1a and 2a are spliced with each other without oxide film being existent therebetween, thereby ensuring sufficient splicing strength. In addition, foreign material such as chips generated by cutting the rolled plates 1 and 2 is prevented from entering the spliced portions 1a and 2a.

Hereinbelow is explained the second type operation of the method to be carried out by using the apparatus in accordance with the second embodiment.

Figure 4:
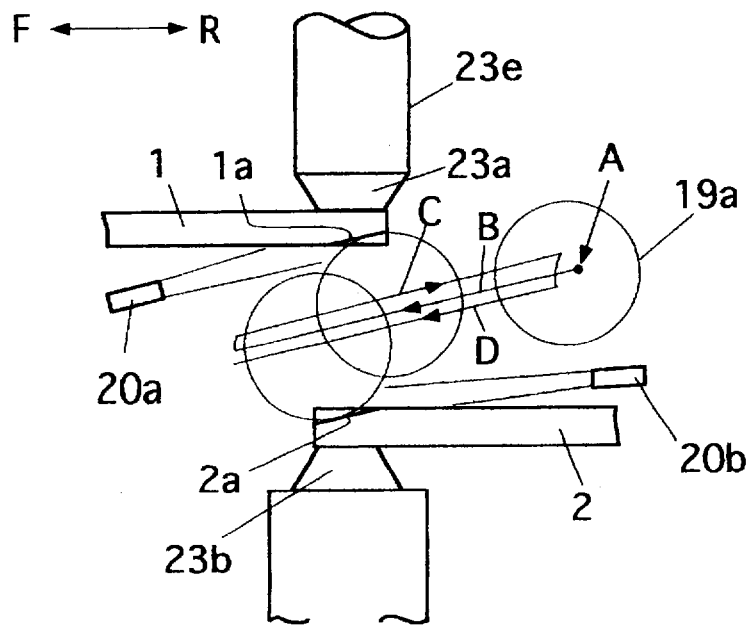
FIG. 4 shows how rolled plates are cut and reduced in a second type operation.

FIG. 4 shows how the cylindrical cutter 19a grinds and how the reducing flame burners 20a and 20b blow reducing flame to the lower surface of the rear end portion of the leading rolled plate 1 and the upper surface of the front end portion of the following rolled plate 2 in the second type operation. The cylindrical cutter 19a is moved along a locus indicated by A in accordance with the swing motion of the arm 19b, and subsequently is moved along a locus indicated by B in accordance with the motion of the arm 19b caused by the reciprocator 19d along the inclined surface of the block 19e. After the cylindrical cutter 19a has been raised, the reciprocator 19d is operated to move the cylindrical cutter 19a along the inclined surface of the block 19e along a locus indicated with C. Thus, the cylindrical cutter 19a obliquely grinds the portion 1a of the lower surface of the rear end portion of the leading rolled plate 1. While the portion 1a is being cut, the reducing flame is blown to the portion 1a from the reducing flame burner 20a to thereby remove scale, prevent oxidation of the portion 1a and blow off chips generated by cutting the rolled plate 1. After the cutting of the portion 1a of the lower surface of the rear end portion of the leading rolled plate 1 has been completed, the arm 19b is swung for lowering the cylindrical cutter 19a. Then, the cylindrical cutter 19a is moved by the reciprocator 19d along a locus indicated with D to grind the portion 2a of the upper surface of the front end portion of the following rolled plate 2. When the cylindrical cutter 19a is lowered, there is formed a space between the portion 1a of the lower surface of the rear end portion of the leading rolled plate 1 and the cylindrical cutter 19a. Thus, the reducing burner 20a cart sufficiently blow reducing flame to the portion 1a through the space.

At the same time when the portion 2a of the upper surface of the front end portion of the following rolled plate 2 is begun to be cut, the reducing flame burner 20b begins to blow reducing flame to the portion 2a to thereby remove scale, prevent oxidation of the portion 1a, and blow off chips generated by cutting the leading rolled plate 1. After the cutting of the rolled plate 2 has been completed, the cylindrical cutter 19a is retreated to the position indicated with a broken line in FIG. 2. Steps to be carried out hereinafter are the same as those of the first type operation.

As is obvious from the foregoing description, what is necessary for reducing the present invention into practice is to construct a facility for running the carriage on existing rolling mills. Thus, the present invention can be carried out with almost no influence being exerted on existing facilities and without stopping existing lines. In addition, it is possible to splice the rolled plates with each other at high speed due to successive cutting and compressing of the rolled plates, obtain sufficient splicing strength by splicing the rolled plates with each other with the spliced portions 1a and 2a being kept in non-oxidation condition, and obtain stable splicing strength by compressing the overlapped portions 1a and 2a of the rolled plates 1 and 2 to a thickness almost equal to a single rolled plate to thereby form a spliced rolled plate having substantially uniform thickness. Furthermore, since reducing flame is blown to the portions 1a and 2a from behind the cylindrical cutter 19a which is cutting the portions 1a and 2a, it is possible to prevent spliced surface of the rolled plates from being oxidized, and also possible to remove chips generated by the cutting of the rolled plates, thereby preventing oxide film and other foreign material from entering the spliced surface of the rolled plates. In addition, when one of the portions 1a and 2a is being cut, there is formed a space between the other and the cylindrical cutter 19a. Thus, the portions 1a and 2a of the rolled plates 1 and 2 can be prevented from being oxidized by blowing reducing flame to the portion 1a or 2a through the space even after the portion 1a or 2a has been completed of the cutting thereof.

Figure 5:
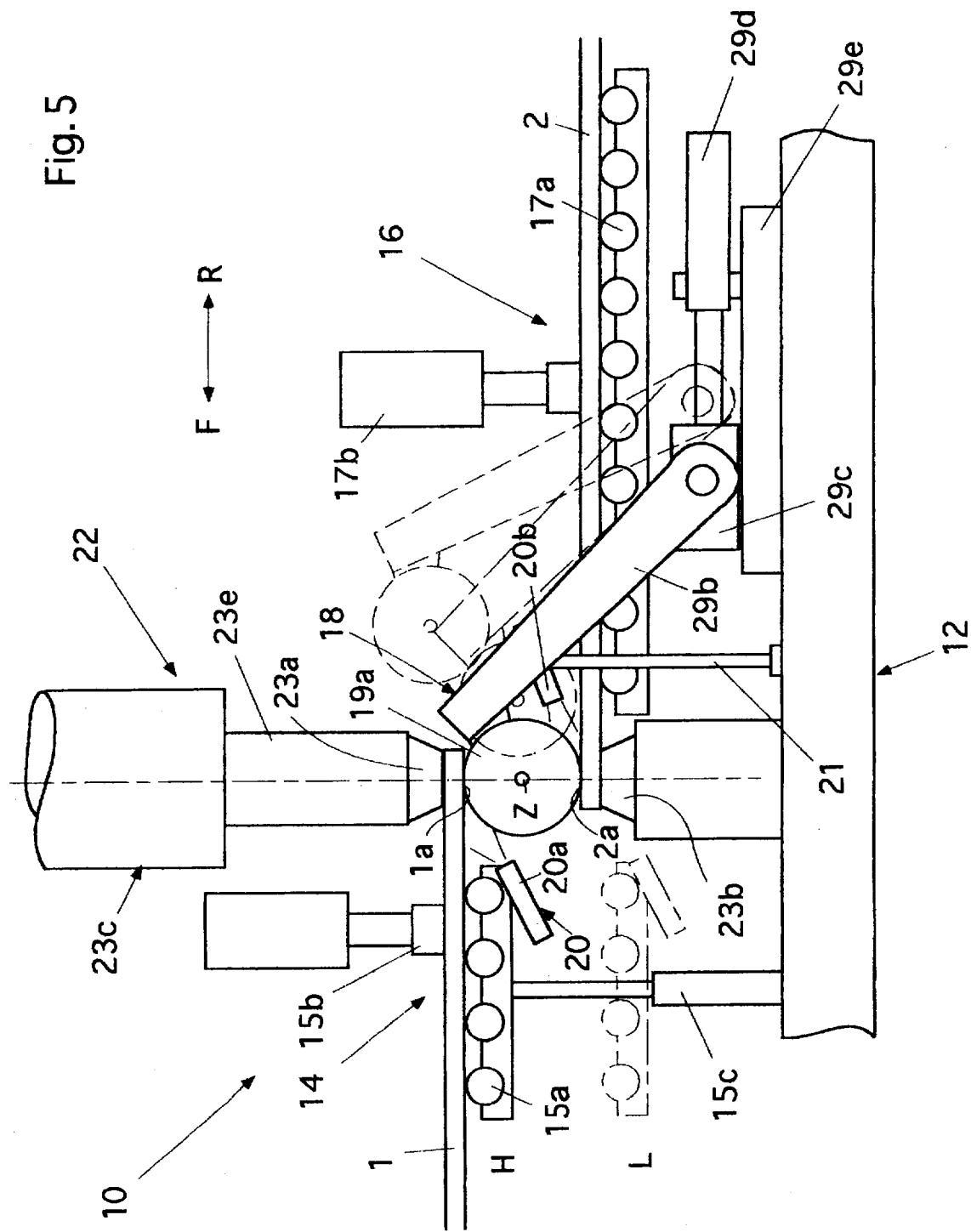
FIG. 5 is a schematic view illustrating an apparatus for splicing rolled plates with each other in accordance with the second embodiment of the present invention.

Hereinbelow will be described an apparatus for splicing rolled plates with each other in accordance with the second embodiment of the present invention. FIG. 5 is a schematic view of the apparatus in accordance with the second embodiment. In the illustrated apparatus, the cutting device 18 concurrently grinds in a common plane the lower surface of the rear end portion of the leading rolled plate 1 and the upper surface of the front end portion of the following rolled plate 2. The cutting device 18 comprises a cylindrical cutter 19a rotatable about an rotation axis Z extending in a width-wise direction of the leading and following rolled plates 1 and 2, a swinger device 29c for obliquely swinging the cylindrical cutter 19a, and a reciprocator 29d for advancing and retreating the cutter 19a in a direction indicated with an arrow A. The cylindrical cutter 19a is secured to a distal end of a swingable arm 29b for rotation about the rotation axis Z, and is rotated by a driver (not illustrated). The cylindrical cutter 19a is longer than an entire width of the rolled plates 1 and 2, and is provided at an outer edge thereof with a plurality of blades having the same diameter. Thus, the cylindrical cutter 19a can concurrently grind the rolled plates 1 and 2 across an entire width of the rolled plates 1 and 2. The swinger device 29c comprises the swingable arm 29b and a cylinder (not illustrated). The swingable arm 29b is carried at a proximal end thereof by a reciprocating table 29e of the reciprocator 29d for pivotal movement. The height of the cylindrical cutter 19a can be adjusted by swinging the swingable arm 29b to thereby obliquely swing the cutter 19a in an arc. The reciprocator 29d comprises the reciprocating table 29e and a reciprocating cylinder, and advances or retreats the cutter 19a in the direction F by horizontally reciprocating the reciprocating table 29e. The above mentioned structure ensures that both the lower surface of the rear end portion of the leading rolled plate 1 and the upper surface of the front end portion of the following rolled plate 2 can be concurrently cut in a common plane by adjusting the height of the cutter 19a and carrying out advance and retreat movement of the cutter 19a. The other structure of the apparatus is the same as that of the first embodiment illustrated in FIGS. 1 and 2.

Figure 6A:
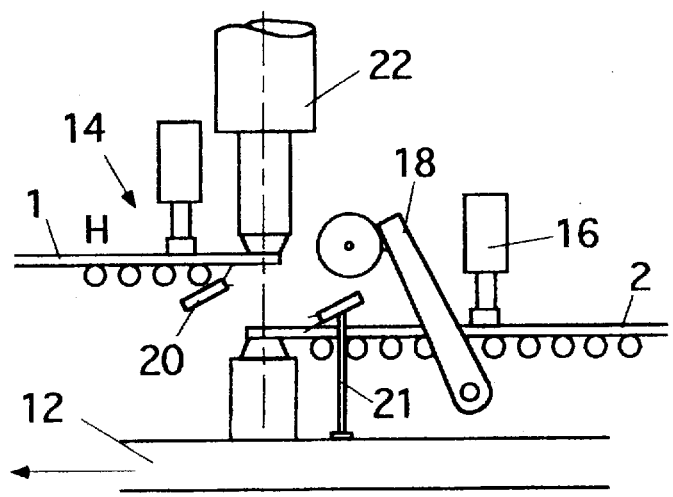
FIGS. 6A, 6B and 6C illustrate each step in a method of splicing rolled plates with each other in accordance with the present invention.
Figure 6B:
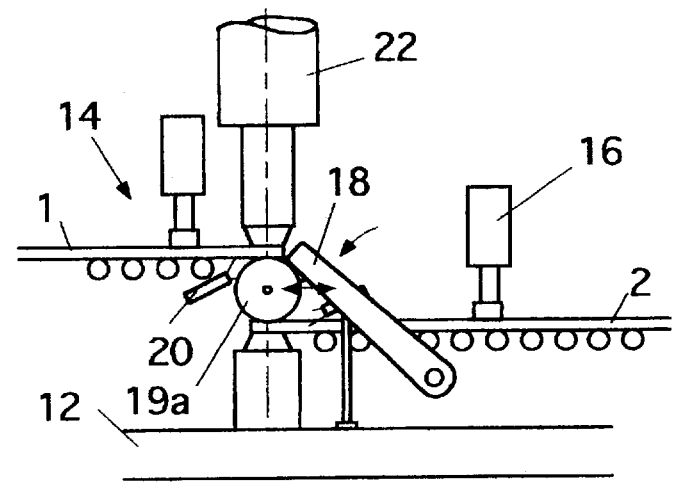
Figure 6C:
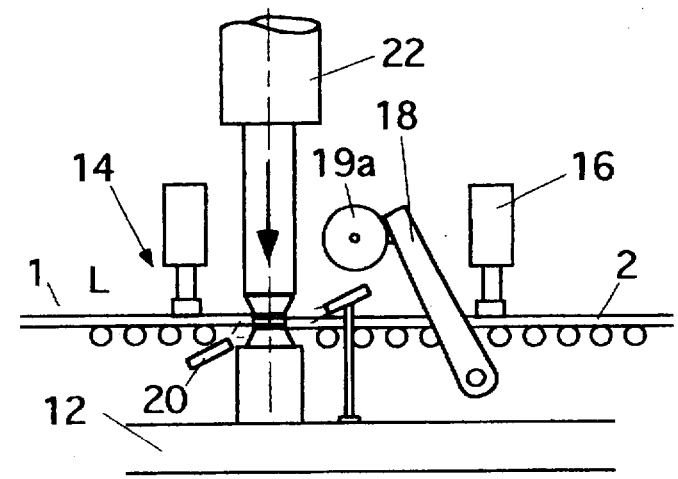

FIGS. 6A, 6B and 6C illustrate each step in a method of splicing rolled plates with each other in accordance with the second embodiment. In FIG. 6A, the carriage 12 is running in the direction F at the same speed as a speed at which the rolled plates 1 and 2 are transferred. The rear end clamp device 14 horizontally clamps the rear end portion of the leading rolled plate 1, while the front end clamp device 16 horizontally clamps the front end portion of the following rolled plate 2. The rear end portion of the leading rolled plate 1 is disposed above and partially overlapped with the front end portion of the following rolled plate 2 to define a spliced portion at which the rolled plates 1 and 2 are to be spliced with each other. The rear end portion of the leading rolled plate 1 is disposed at the cutting height H by means of the rear end clamp device 14. The cutting device 18 and the pressure welding machine 22 are on standby, and a lower surface of the upper die 23a is in contact with an upper surface of the rear end portion of the leading rolled plate 1, while an upper surface of the lower die 23b is in contact with a lower surface of the front end portion of the following rolled plate 2.

Then, as illustrated in FIG. 6B, the cutting device 18 swings the cutter 19a to move it to the cutting height, and then advances or retreats the cutter 19a in the direction F to concurrently grind in a common plane the lower surface of the rear end portion of the leading rolled plate 1 and the upper surface of the front end portion of the following rolled plate 2. While the rolled plates are being cut, the portions being cut by the cutter 19a are kept in non-oxidation condition by the non-oxidation condition keeping device 20.

Then, as illustrated in FIG. 6C, the cutter 19a is returned to its standby position, and the rear end portion of the leading rolled plate 1 is lowered down to the compression height L by the rear end clamp device 14. At the same time, the pressure welding machine 22 compresses the overlapped portions of the leading and following rolled plates 1 and 2 approximately to a thickness of a single rolled plate. Thus, the splicing of the rolled plates 1 and 2 is completed. While the rolled plates 1 and 2 are being spliced by compression, the portions cut by the cutter 19a are kept in non-oxidation condition by the non-oxidation condition keeping device 20.

Then, the rear end clamp device 14, the front end clamp device 16 and the pressure welding machine 22 are released, and the carriage 12 is retreated to its standby position.

By the above mentioned method, a leading rolled plate can be spliced to a following rolled plate with rolled plates being successively supplied to a finishing rolling mill. In addition, since rolled plates can be spliced with each other across an entire width of the rolled plates in only two steps, namely, a step for cutting the rolled plates by the cutting device and a step for compressing the rolled plates by the pressure welding machine, it is possible to remarkably reduce time for splicing the rolled plates with each other, and shorten an entire length of rolling facility.

As having been described, in the apparatus and method in accordance with the invention, the carriage runs in a direction, in which leading and following rolled plates are being transferred, with the leading and following rolled plates being clamped by the rear end clamp device and the front end clamp device. Thus, it is possible to successively supply rolled plates to a finishing rolling mill. In addition, since the rolled plates can be spliced with each other across an entire width of the rolled plates only in two steps, namely, a step for cutting the rolled plates by the cutting device and a step for compressing the rolled plates by the pressure welding device, it is possible to remarkably reduce time for splicing the rolled plates with each other, and shorten an entire length of a facility for rolling.

Furthermore, the lower surface of the rear end portion of the leading rolled plate and the upper surface of the front end portion of the following rolled plate are concurrently cut by the cutting device in a common plane, and further the cut portions of the rolled plates are compressed by the pressure welding device to a thickness of a single rolled plate while the cut portions of the rolled plates are maintained in non-oxidation condition by the non-oxidation condition keeping device. As a result, the leading and following rolled plates can be closely spliced without oxidation of the spliced portions of the rolled plates and also without any gap between the rolled plates, and hence it is possible to obtain sufficient splicing strength across an entire width of the rolled plates. In addition, since the leading and following rolled plates are compressed to a thickness of a single rolled plate and then spliced with each other by the pressure welding device, there is formed almost no irregularity at the spliced portions of the rolled plates, and thus the spliced portions can be substantially uniformly compressed.

Accordingly, the apparatus and method in accordance with the invention makes it possible to run along with rolled plates being transferred and at the same time splice a rear end portion of a leading rolled plate with a front end portion of a following rolled plate. Thus, rolled plates can be spliced with each other with sufficient splicing strength across an entire width of the rolled plates in a short period of time, and spliced portion of the rolled plates can be substantially uniformly rolled with almost no irregularities being formed on the spliced portion. Thus, the invention provides an advantage that rolled plates can be successively supplied to a finishing rolling mill.

Hereinbelow will be explained an apparatus for splicing rolled plates with each other in accordance with the third embodiment of the present invention. FIG. 7 is a schematic view illustrating the apparatus in accordance with the third embodiment. In the illustrated apparatus, the cutting device 18 concurrently, obliquely grinds the lower surface of the rear end portion of the leading rolled plate and the upper surface of the front end portion of the following rolled plate.

In the illustrated apparatus, the cutting device 18 comprises a cylindrical cutter 19a rotatable about an rotation axis Z extending in a width-wise direction of the leading and following rolled plates 1 and 2, and a reciprocator 39b for reciprocating the cutter 19a obliquely as viewed from a direction indicated with an arrow A. The cylindrical cutter 19a is rotated by a driver (not illustrated). The cylindrical cutter 19a is longer than an entire width of the rolled plates 1 and 2, and is provided at an outer edge thereof with a plurality of blades having the same diameter. Thus, the cylindrical cutter 19a can concurrently grinds the rolled plates 1 and 2 across an entire width of the rolled plates 1 and 2. The other structure of the apparatus is the same as that of the first embodiment illustrated in FIGS. 1 and 2.

In this embodiment, the cutting device concurrently and obliquely, as viewed in the direction F, grinds both the lower surface of the rear end portion of the leading rolled plate 1 and the upper surface of the front end portion of the following rolled plate 2. Thus, a thickness of the overlapped portions of the leading and following rolled plates prior to splice is thinner than a thickness of overlapped rolled plates which are not obliquely cut, and a compression force for compressing the overlapped rolled plates to a thickness of a single rolled plate and splicing the rolled plates with each other can be made smaller. Hence, even an apparatus having relatively small size and output could splice rolled plates with each other with almost no irregularities on the spliced portions of the rolled plates.

FIGS. 8A to 8D schematically show the splice by compression of rolled plates. It is known that a load P necessary for splicing rolled plates by compression is in proportion to n-th power of a compression strain $\epsilon$, namely, $P \propto \epsilon n$ wherein n is nearly equal to 0.21. When two rolled plates illustrated in FIG. 8A are compressed to a thickness of a single rolled plate as illustrated in FIG. 8B, a compression strain $\epsilon$ is defined as follows: $\epsilon = \ln(2t/t) = 0.693$. On the other hand, as illustrated in FIG. 8C, when two rolled plates each having an obliquely cut end portion are compressed to a thickness of a single rolled plate, it is possible to reduce the compression force P. For instance, provided that a thickness "t" of each of the rolled plate is 40 mm and a compression margin S is 5 mm in FIG. 8C, a compression strain $\epsilon$ is calculated as follows:

$$\epsilon = \ln[(t+S)/t] = 0.1118$$

Thus, the compression force P can be reduced by about 31%.

Figure 9A:
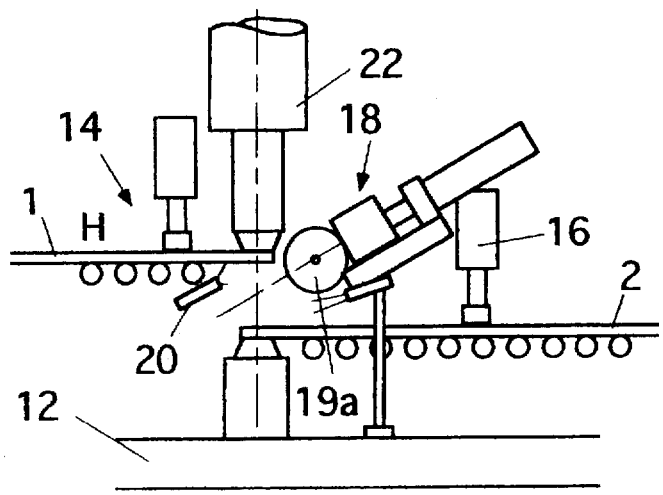
FIGS. 9A, 9B and 9C illustrate each step in a method of splicing rolled plates with each other in accordance with the present invention.
Figure 9B:
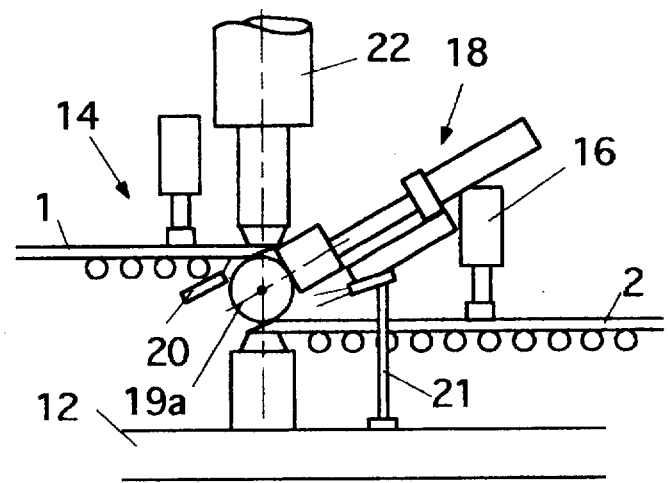
Figure 9C:
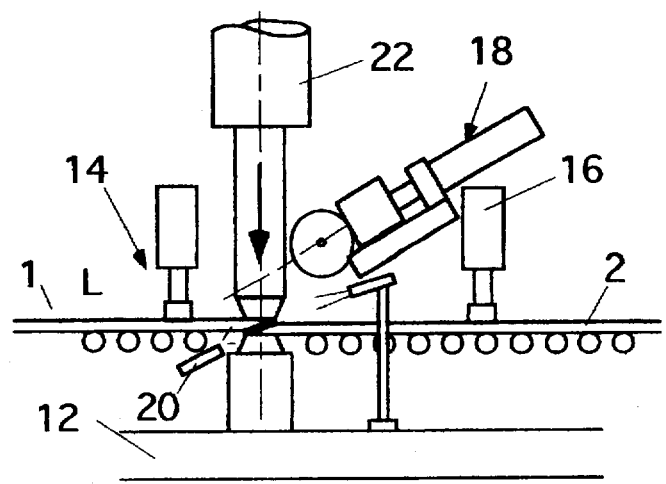

FIGS. 9A, 9B and 9C illustrate each step in a method of splicing rolled plates with each other in accordance with the second embodiment. In FIG. 9A, the rear end clamp device 14 horizontally clamps the rear end portion of the leading rolled plate 1, while the front end clamp device 16 horizontally clamps the front end portion of the following rolled plate 2. The rear end portion of the leading rolled plate 1 is disposed above and partially overlapped with the front end portion of the following rolled plate 2 to define a spliced portion at which the rolled plates 1 and 2 are to be spliced with each other. The rear end portion of the leading rolled plate 1 is disposed at the cutting height H by means of the rear end clamp device 14. The cutting device 18 and the pressure welding machine 22 are on standby, and a lower surface of the upper die 23a is in contact with an upper surface of the rear end portion of the leading rolled plate 1, while an upper surface of the lower die 23b is in contact with a lower surface of the front end portion of the following rolled plate 2.

Then, as illustrated in FIG. 9B, the reciprocator 39b of the cutting device 18 obliquely reciprocates the cutter 19a in the direction F, and then concurrently, obliquely grinds the lower surface of the rear end portion of the leading rolled plate 1 and the upper surface of the front end portion of the following rolled plate 2. While the rolled plates are being cut, the portions being cut by the cutter 19a are kept in non-oxidation condition by the non-oxidation condition keeping device 20.

Then, as illustrated in FIG. 9C, the cutter 19a is returned to its standby position, and the rear end portion of the leading rolled plate 1 is lowered down to the compression height L by the rear end clamp device 14. At the same time, the pressure welding machine 22 compresses the overlapped portions of the leading and following rolled plates 1 and 2 approximately to a thickness of a single rolled plate. Thus, the splicing of the rolled plates 1 and 2 is completed. While the rolled plates 1 and 2 are being spliced by compression, the portions cut by the cutter 19a are kept in non-oxidation condition by the non-oxidation condition keeping device 20.

In accordance with the above mentioned method, the cutting device concurrently and obliquely grinds the end portions of the leading and following rolled plates. Thus, a thickness of the overlapped portions of the leading and following rolled plates prior to splice is thinner than a thickness of overlapped rolled plates which are not obliquely cut, and a compression force for compressing the overlapped rolled plates to a thickness of a single rolled plate and splicing the rolled plates with each other can be made smaller. Hence, even an apparatus having relatively small size and output could splice rolled plates with each other with almost no irregularities on the spliced portions of the rolled plates.

In addition, since the rolled plates can be spliced with each other across an entire width of the rolled plates in only two steps, namely, a step for cutting the rolled plates and a step for compressing the rolled plates, it is possible to remarkably reduce the time required for splicing the rolled plates with each other. Furthermore, the rolled plates are cut and compressed to each other, while the spliced portions of the rolled plates are maintained in non-oxidation condition. As a result, the leading and following rolled plates can be closely spliced without oxidation of the spliced portions of the rolled plates and also without any gap between the rolled plates, and it is possible to obtain sufficient splicing strength across an entire width of the rolled plates.

As having been described, the apparatus and method in accordance with the invention makes it possible to splice end portions of rolled plates with each other. Thus, the present invention provides advantages that rolled plates can be spliced with each other with sufficient splicing strength across an entire width of the rolled plates in a shorter period of time, and spliced portion of the rolled plates can be substantially uniformly rolled with almost no irregularities being formed on the spliced portion.

Figure 10:
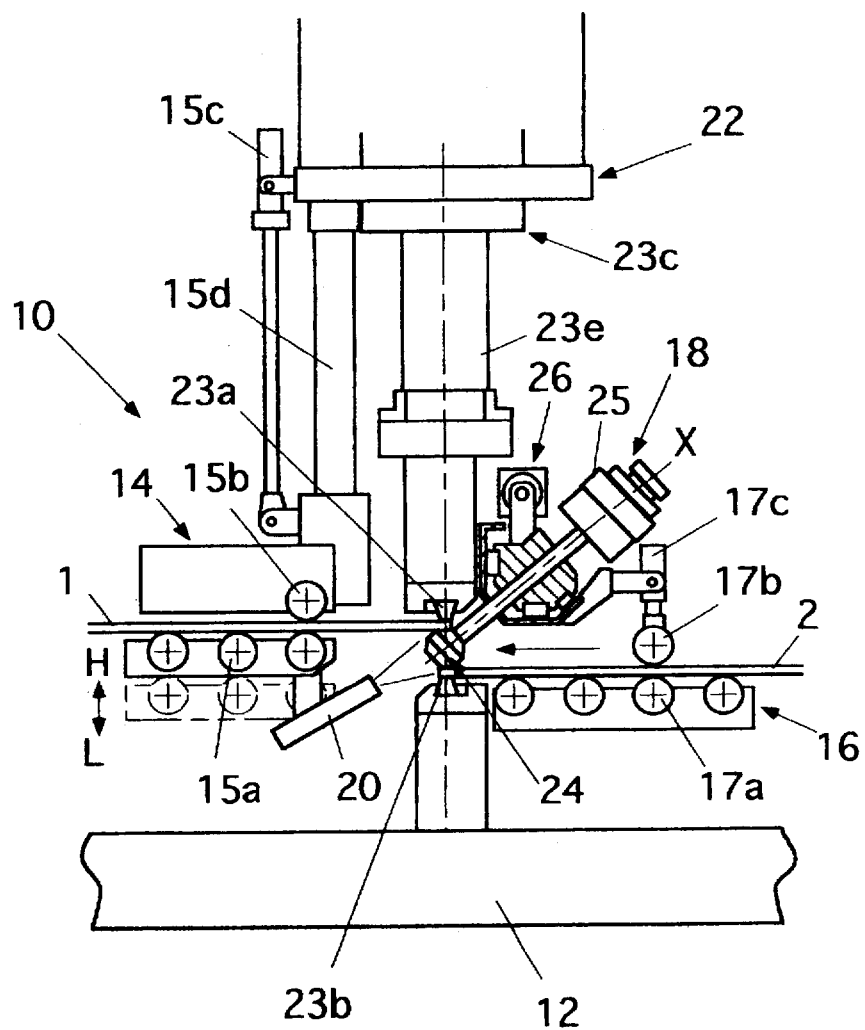
FIG. 10 is a schematic view illustrating an apparatus for splicing rolled plates with each other in accordance with the fourth embodiment of the present invention.
Figure 11A:
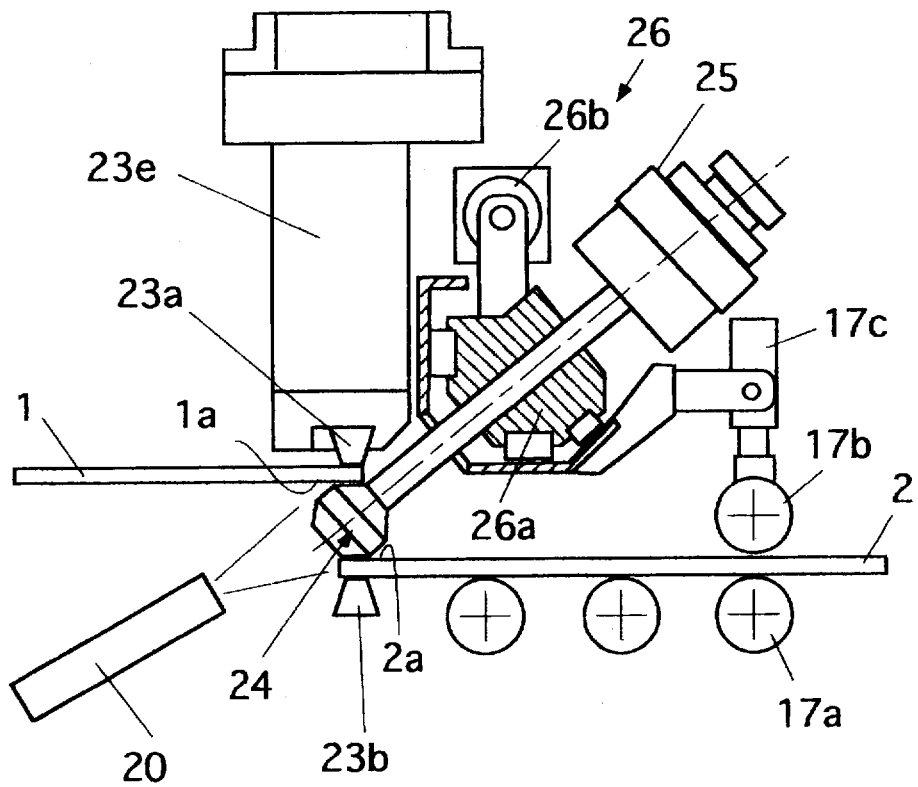
FIGS. 11A and 11B are enlarged views of a part of the apparatus illustrated in FIG. 10.
Figure 11B:
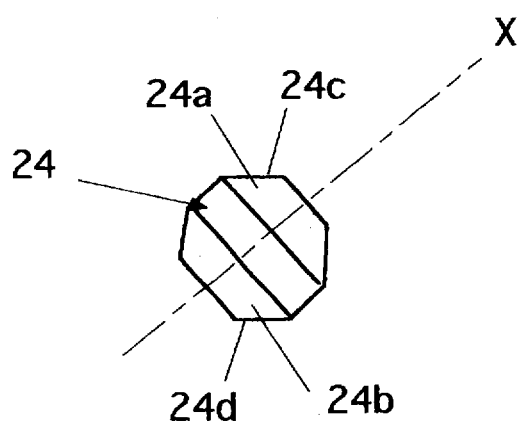

Hereinbelow will be described an apparatus for splicing rolled plates with each other in accordance with the fourth embodiment of the present invention. FIG. 10 is a schematic view of the apparatus in accordance with the fourth embodiment, and FIGS. 11A and 11B are enlarged views of main parts of the apparatus illustrated in FIG. 10. With reference to FIGS. 10, 11A and 11B, the apparatus 10 includes a rear end clamp device 14 mounted on a base table 12 and designed to horizontally clamp a rear end portion of a leading rolled plate 1 therebetween and to be vertically movable, a front end clamp device 16 mounted on the base table 12 and designed to horizontally clamp a front end portion of a following rolled plate 2 therebetween, a cutting device 18 for concurrently cutting a lower surface of the rear end portion of the leading rolled plate 1 and an upper surface of the front end portion of the following rolled plate 2, a non-oxidation condition keeping device 20 for keeping portions 1a and 2a (see FIG. 11A) of the rolled plates being cut in non-oxidation condition, and a pressure welding machine 22 for compressing the overlapped portions 1a and 2a of the leading and following rolled plates 1 and 2 to a thickness almost equal to a thickness of a single rolled plate.

As illustrated in FIGS. 10 and 11A, the cutting device 18 comprises a conical cutter 24 rotatable about a rotation axis X extending obliquely with respect to the horizontal, and a transfer device 26 for horizontally transferring the conical cutter 24 in a width-wide direction of the leading and following rolled plates 1 and 2 across an entire width of the rolled plates 1 and 2. This transfer device 26 is disposed out of the leading and following rolled plates 1 and 2. As illustrated in FIG. 11B, the conical cutter 24 has a pair of frustconical surfaces 24a and 24b having outwardly facing apexes. The frustconical surface 24a has substantially horizontal uppermost portion 24c, and the frustconical surface 24b has substantially horizontal lowermost portion 24d. The portions 24c and 24d are to concurrently come to contact with the lower surface of the rear end portion of the leading rolled plate 1 and the upper surface of the front end portion of the following rolled plate 2, respectively. The conical cutter 24 is rotated by a cutter driver 25 about an axis X. The transfer device 26 includes a horizontally extending cylinder 26b for horizontally transferring a block 26a to which the cutter driver 25 is secured. Thus, it is possible to concurrently grind the lower surface of the rear end portion of the leading rolled plate 1 and the upper surface of the front end portion of the following rolled plate 2 across an entire width of the rolled plates 1 and 2 in a shorter period of time only by raising the rear end portion of the leading rolled plate 1 by means of the rear end clamp device 14 and transferring the rotating conical cutter 24 by means of the transfer device 26 in the width-wise direction of the rolled plates 1 and 2 across an entire width of the rolled plates 1 and 2. The transfer device 26 is first disposed out of the leading and following rolled plates 1 and 2, and then moved below or above the rolled plates 1 and 2.

With reference to FIGS. 10 and 11A, the rear end clamp device 14 comprises a plurality of rollers 15a for horizontally supporting the rear end portion of the leading rolled plate 1, a clamp roller 15b for clamping the rear end portion of the leading rolled plate 1 between itself and the rollers 15a, and an elevator device for raising and lowering the rollers 15a and the clamp roller 15b between a cutting height H at which the lower surface of the rear end portion of the leading rolled plate 1 is made come to contact with an upper edge of the conical cylindrical cutter 24, and a compression height L at which the rear end portion of the leading rolled plate 1 is set almost level with the front end portion of the following rolled plate 2. The elevator device comprises, for instance, a hydraulic cylinder 15c and a guide rod 15d. By the above mentioned structure, the clamp roller 15b can clamp the rear end portion of the leading rolled plate 1 between itself and the rollers 15a with the rear end portion of the leading rolled plate 1 being horizontally supported by means of the rollers 15a. While the rollers 15a and the clamp roller 15b are kept at the cutting height H by means of the hydraulic cylinder 15c of the elevator device, the lower surface of the rear end portion of the leading rolled plate 1 and the upper surface of the front end portion of the following rolled plate 2 can be concurrently cut with the single conical cutter 24. In addition, while the rollers 15a and the clamp roller 15b are kept at the compression height L by means of the hydraulic cylinder 15c, the leading and following rolled plates 1 and 2 can be overlapped at their cut portions 1a and 2a, and then compressed by the pressure welding machine 22 to thereby splice the rolled plates 1 and 2 with each other.

The front end clamp device 16 comprises a plurality of rollers 17a for horizontally supporting the front end portion of the following rolled plate 2, and a clamp roller 17b for clamping the front end portion of the following rolled plate 2 between itself and the rollers 17a. The clamp roller 17c is vertically movable by means of a hydraulic cylinder 17c. By the above mentioned structure, the clamp roller 17b can clamp the front end portion of the following rolled plate 2 between itself and the rollers 17a with the front end portion of the following rolled plate 2 being horizontally supported by means of the rollers 17a. The structure other than the foregoing is the same as that of the first embodiment illustrated in FIGS. 1 and 2.

The invention having the above mentioned structure enables to concurrently grind the lower surface of the rear end portion of the leading rolled plate and the upper surface of the front end portion of the following rolled plate across an entire width of the rolled plates in a short period of time, and splice them with each other with sufficient splicing strength across an entire width of the rolled plates in a short period of time by compressing the rolled plates with the pressure welding machine. Thus, the apparatus for splicing rolled plates with each other in accordance with the invention provides an advantage that rolled plates can be spliced with sufficient splicing strength across an entire width of the rolled plates in a short period of time.

In the above mentioned embodiments, a leading rolled plate is positioned above a following rolled plate in overlapping relation. However, it should be noted that the invention is not to be limited to those embodiments. For instance, a following rolled plate may be positioned above a leading rolled plate in overlapping relation, and an upper surface of a rear end portion of a leading rolled plate and a lower surface of a front end portion of a following rolled plate may be cut for splicing them with each other.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of splicing rolled plates with each other, comprising the steps of:

(a) positioning a rear end portion of a leading rolled plate above a front end portion of a following rolled plate by a distance slightly greater than a diameter of a cylindrical cutter having a rotation axis extending in a width-wise direction of said leading and following rolled plates and being movable in parallel with an inclined plane which is downwardly inclined as viewed in a direction F in which said rolled plates are being transferred, said positioning being carried out while said leading and following rolled plates are being transferred;

(b) cutting an upper surface of said front end portion of said following rolled plate with said cylindrical cutter only within a region at which said following rolled plate is to be spliced with said leading rolled plate, said cutting being carried out in said direction F;

(c) blowing a first reducing flame on said upper surface being cut from above said upper surface in said direction F while said step (b) is being carried out;

(d) cutting a lower surface of said rear end portion of said leading rolled plate only within a region at which said leading rolled plate is to be spliced with said following rolled plate, said cutting being carried out in a direction R opposite to said direction F after said step (b) has been completed;

(e) blowing a second reducing flame on said lower surface being cut from below said lower surface in said direction R while said step (d) is being carried out; and (f) splicing said leading rolled plate with said following rolled plate by compression at said leading rolled plate with said following rolled plate by compression at said region after said step (d) has been completed, said reducing flame being blown to both said upper surface of said front end portion of said following rolled plate and said lower surface of said rear end portion of said leading rolled plate until said splicing is completed.

2. A method of splicing rolled plates with each other, comprising the steps of:

(a) positioning a rear end portion of a leading rolled plate above a front end portion of a following rolled plate by a distance slightly greater than a diameter of a cylindrical cutter having a rotation axis extending in a width-wise direction of said leading and following rolled plates and being movable in parallel with an inclined plane which is downwardly inclined as viewed in a direction F in which said rolled plates are being transferred, said positioning being carried out while said leading and following rolled plates are being transferred;

(b) cutting an lower surface of said rear end portion of said leading rolled plate with said cylindrical cutter only within a region at which said leading rolled plate is to be spliced with said following rolled plate, said cutting being carried out in a direction R opposite to said direction F;

(c) blowing a first reducing flame on said lower surface being cut from below said lower surface in said direction R while said step (b) is being carried out;

(d) cutting an upper surface of said front end portion of said following rolled plate only within a region at which said following rolled plate is to be spliced with said leading rolled plate, said cutting being carried out in said direction F after said step (b) has been completed;

(e) blowing a second reducing flame on said upper surface being cut from above said upper surface in said direction F while said step (d) is being carried out; and (f) splicing said leading rolled plate with said following rolled plate by compression at said region after said step (d) has been completed, said reducing flame being blown to both said upper surface of said front end portion of said following rolled plate and said lower surface of said rear end portion of said leading rolled plate until said splicing is completed.

3. An apparatus for splicing rolled plates with each other, comprising:

a carriage movable in a direction F in which said rolled plates are being fed;

a rear end clamp device mounted on said carriage for horizontally clamping a rear end portion of a leading rolled plate, said rear end clamp apparatus being vertically movable, and including a cylinder for raising and lowering said lower surface of said rear end portion of said leading rolled plate between a cutting height H at which said lower surface of said rear end portion of said leading rolled plate comes to contact with an upper edge of said cutter, and a compressing height L at which said rear end portion of said leading rolled plate is kept approximately level with said front end portion of said following rolled plate;

a front end clamp device mounted on said carriage for horizontally clamping a front end of a following rolled plate;

a cutting device for cutting a lower surface of an end portion of one of said leading and following rolled plates and an upper surface of an end portion of the other, including a cylindrical cutter rotatable about a rotation axis extending in a width-wise direction of said leading an following rolled plates, a swinger device for obliquely swinging said cutter, and a reciprocator for advancing or retreating said cylindrical cutter in said direction F;

means for keeping said lower and upper surfaces being cut in non-oxidation condition; and a pressure welding device for compressing said lower and upper surfaces of said end portions of said leading and following rolled plates one on the other to a thickness almost equal to a thickness of said leading or following rolled plate to thereby splice said leading and following rolled plates to each other.

4. An apparatus for splicing rolled plates with each other, comprising:

a carriage movable in a direction F in which said rolled plates are being fed;

a rear end clamp device mounted on said carriage for horizontally clamping a rear end portion of a leading rolled plate, said rear end clamp apparatus being vertically movable;

a front end clamp device mounted on said carriage for horizontally clamping a front end of a following rolled plate;

a cutting device for cutting a lower surface of an end portion of one of said leading and following rolled plates and an upper surface of an end portion of the other, wherein said cutting device concurrently, obliquely grinds said lower surface of said end portion of one of said leading and following rolled plates and said upper surface of said end portion of the other, and wherein said cutting device comprises a cylindrical cutter rotatable about an rotation axis extending in a width-wise direction of said leading an following rolled plates, and a reciprocator for reciprocating said cutter obliquely as viewed in said direction F;

means for keeping said lower and upper surfaces being cut in non-oxidation condition; and a pressure welding device for compressing said lower and upper surfaces of said end portions of said leading and following rolled plates one on the other to a thickness almost equal to a thickness of said leading or following rolled plate to thereby splice said leading and following rolled plates to each other.

5. An apparatus for splicing rolled plates with each other, comprising:

a carriage movable in a direction F in which said rolled plates are being fed;

a rear end clamp device mounted on said carriage for horizontally clamping a rear end portion of a leading rolled plate, said rear end clamp apparatus being vertically movable;

a front end clamp device mounted on said carriage for horizontally clamping a front end of a following rolled plate;

a cutting device for cutting a lower surface of an end portion of one of said leading and following rolled plates and an upper surface of an end portion of the other, including a conical cutter rotatable about a rotation axis extending obliquely with respect to a horizontal, and a transfer device for horizontally transferring said conical cutter in a width-wide direction of said leading an following rolled plates across entire width of said rolled plates, said transfer device being disposed out of said leading and following rolled plates, wherein said conical cutter has a pair of frustconical surfaces having outwardly facing apexes, and wherein said frustconical surfaces have substantially horizontal uppermost and lowermost portions which concurrently come in contact with said lower surface and upper surface of said end portions of said leading and following rolled plates, respectively;

means for keeping said lower and upper surfaces being cut in non-oxidation condition; and a pressure welding device for compressing said lower and upper surfaces of said end portions of said leading and following rolled plates one on the other to a thickness almost equal to a thickness of said leading or following rolled plate to thereby splice said leading and following rolled plates to each other.

6. An apparatus for splicing rolled plates with each other, comprising:

a carriage movable in a direction F in which said rolled plates are being fed;

a rear end clamp device mounted on said carriage for horizontally clamping a rear end portion of a leading rolled plate, said rear end clamp apparatus being vertically movable;

a front end clamp device mounted on said carriage for horizontally clamping a front end of a following rolled plate;

a cutting device for cutting a lower surface of an end portion of one of said leading and following rolled plates and an upper surface of an end portion of the other;

means for keeping said lower and upper surfaces being cut in non-oxidation condition;

a pressure welding device for compressing said lower and upper surfaces of said end portions of said leading and following rolled plates one on the other to a thickness almost equal to a thickness of said leading or following rolled plate to thereby splice said leading and following rolled plates to each other, and a vertically swingable oblique guide for guiding said rolled plates to said front end clamp device from said compression height, and also for guiding said rolled plates to said compression height from said rear end clamp device.

7. An apparatus for splicing rolled plates with each other, comprising:

a carriage movable in a direction F in which said rolled plates are being fed, including a cylindrical cutter rotatable about a rotation axis extending in a width-wise direction of said leading and following rolled plates, a swinger device for swinging said cylindrical cutter about an axis extending in a width-wise direction of said leading an following rolled plates, and a reciprocator for reciprocating said swinger device in a direction F in which said leading and following rolled plates are being fed;

a rear end clamp device mounted on said carriage for horizontally clamping a rear end portion of a leading rolled plate, said rear end clamp apparatus being vertically movable;

a front end clamp device mounted on said carriage for horizontally clamping a front end of a following rolled plate;

a cutting device for cutting a lower surface of an end portion of one of said leading and following rolled plates and an upper surface of an end portion of the other;

means for keeping said lower and upper surfaces being cut in non-oxidation condition, including a first reducing flame burner attached to said rear end clamp device for blowing reducing flame to said lower surface, which is being cut with said cylindrical cutter with said leading rolled plate being supported by said rear end clamp device, from below said leading rolled plate in a direction R opposite to said direction F, and a second reducing flame burner attached to said carriage for blowing reducing flame to said upper surface, which is being cut with said cylindrical cutter with said following rolled plate being supported by said front end clamp device, from above said following rolled plate in said direction F; and a pressure welding device for compressing said lower and upper surfaces of said end portions of said leading and following rolled plates one on the other to a thickness almost equal to a thickness of said leading or following rolled plate to thereby splice said leading and following rolled plates to each other.

8. The apparatus as recited in claim 7, wherein said reciprocator of said cutting device is designed for reciprocating motion on an inclined plane which is downwardly inclined as viewed in said direction F.

* * * * *